(No Model.)
W. E. NICKERSON.
FLUID SPEED REGULATOR FOR ELEVATORS.
No. 403,437. Patented May 14, 1889.
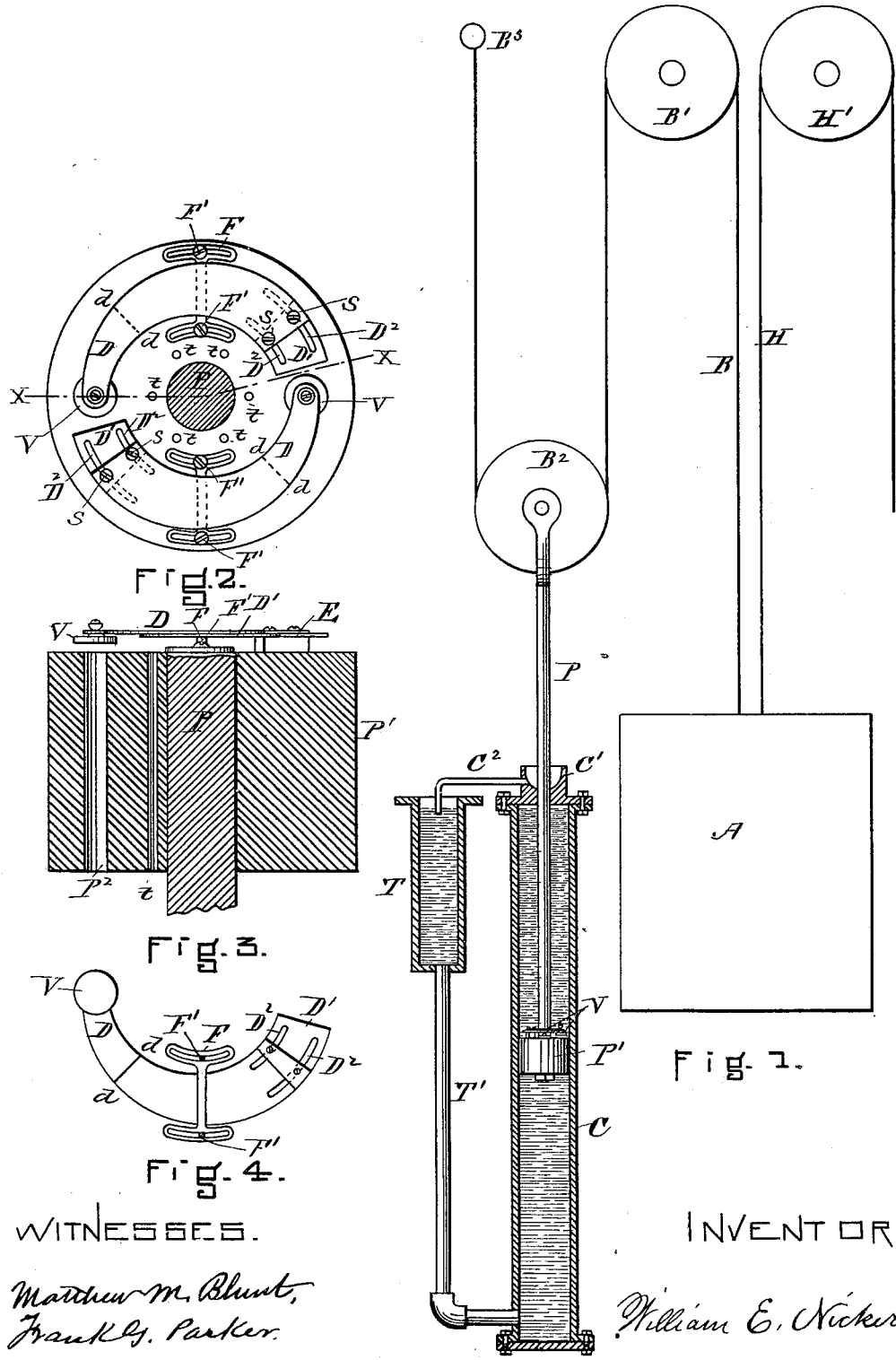
WITNESSES.
Matthew M. Blunt,
Frank G. Parker.
INVENTOR.
William E. Nickerson

UNITED STATES PATENT OFFICE.

WILLIAM E. NICKERSON, OF CAMBRIDGE, MASSACHUSETTS.

FLUID SPEED-REGULATOR FOR ELEVATORS.

SPECIFICATION forming part of Letters Patent No. 403,437, dated May 14, 1889.

Application filed February 4, 1889. Serial No. 298,560. (No model.)

*To all whom it may concern:*

Be it known that I, WILLIAM EMERY NICKERSON, of Cambridge, in the county of Middlesex and State of Massachusetts, have invented certain new and useful Improvements in Fluid Speed-Regulators for Elevators, of which the following, taken in connection with the accompanying drawings, is a specification.

The main object of my invention is to combine with a simple retarding-cylinder a reservoir and supply-pipe that shall admit of the necessary inflowing and egress of fluid required for compensating for the space occupied and vacated by the piston-rod, and thereby effectually prevent a vacuum from forming under the piston as it ascends, and also to provide an ample reservoir for holding liquid in readiness to make up for loss due to evaporation or other causes.

In the accompanying drawings, which illustrate my invention, Figure 1 is a view partly in section and partly in elevation, only such parts of an elevator being shown as are required to illustrate the use of my device. Fig. 2 is a plan, enlarged, of the piston of my retarding-cylinder. Fig. 3 is a vertical section taken on line $x\ x$ of Fig. 2; and Fig. 4 is a plan view of the valve-retractor device, looking from the under side.

In Fig. 1, A represents an elevator-carriage; H, the hoisting-rope, which passes over the pulley H' and then to the hoisting-engine. The retarding-rope B passes over the stationary pulley B' and under the moving pulley B², attached to the upper end of the piston-rod P, thence to a fixed holder, B³.

The retarding device consists of the piston-rod P and piston P', together with the cylinder C. The piston P' traverses the cylinder C with comparative freedom so far as friction is concerned, as the piston need not fit tightly in the cylinder. To the lower end of the cylinder C, I have attached a pipe, T', which serves as a communication between the cylinder C and the reservoir T. In the piston P', (see Figs. 2 and 3,) I have one or more openings, P², over which I have a spring-valve, V. The valve in its free position is not on its seat, but above it, as shown in Fig. 3, so that as the piston moves downward the fluid below it may pass through almost unrestricted. This is also true when the piston is moving slowly upward, as it does when the elevator-carriage is descending at its normal velocity.

It will be observed that when the piston P' is descending the piston-rod P in entering the cylinder C will force some of the fluid from the cylinder C through the pipe T' and into the reservoir T, and that in the ascent of the piston fluid will flow from the reservoir T through the pipe T' back into the cylinder to occupy the space vacated by the piston-rod P. Thus in the movement of the piston downward the valves V have no function to perform, and in the movement of the piston upward (letting the elevator-carriage descend) the valves V are inoperative as long as the piston moves with a speed that is less or does not exceed the normal velocity; but when that velocity is exceeded the rush of fluid through the valve-openings P² will generate enough force to close the valve, and thus check the speed.

The valves V are each attached to a spring plate or retractor, D, which lies immediately above the auxiliary spring-plate D', Figs. 2, 3, and 4. Both of the plates D and D' are secured to the block E on the piston P' (see Fig. 3) by screws S. The auxiliary plate D' has slots D² D², through which the screws S S pass. The slots D² D² admit of sliding the auxiliary plate D' back and forth, so that the force of the spring in its action on the valve V may be varied to suit the required velocity of the piston. The tension of the spring is also varied by moving the fulcrum-piece F back and forth. The fulcrum-piece F is held in place by screws F', which pass through slots, as shown in Figs. 2 and 4, to admit of adjustment.

The piston P may be fitted loosely or have openings $t\ t\ t$, Fig. 2, to admit of the passage of a limited amount of fluid, so that the closing of the valves may not entirely check the descent of the elevator. The piston-rod P is intended to pass through the top plate, C', fluid-tight, and may be rendered so by any of the ordinary styles of stuffing-boxes. In case there is a leakage, I have provided a drip-pipe, C², Fig. 1, which serves to allow it to pass into the reservoir.

The reservoir T may be kept supplied with water by means of an automatic lever-cock and float in connection with a water-pipe.

The operation of my device is as follows: As the elevator-carriage ascends the weight of the piston P', its rod, and the pulley B² combined is ample to force the whole down, taking up the slack of the rope B. As the carriage descends the piston B' moves upward with one-half of the velocity of the carriage, allowing the carriage to move with a safe speed and no faster, for as soon as the speed increases to dangerous limit then the rush of fluid through the valve-openings P² will be so great as to close the valves, and thus check the speed. By the arrangement of the reservoir T and pipe T', I am enabled to prevent any vacuum from forming under the piston P' as it ascends, thus insuring the even steady motion of the carriage as it descends and in stopping and starting.

I claim—

1. In a speed-retarding device, the combination of the cylinder C, piston-rod P, piston P', and valve V with the pipe T' and reservoir T, having free communication with the lower part of the cylinder C, substantially as and for the purpose set forth.

2. In a fluid speed-retarding device, the combination of the piston P' and valve V with the retractor-spring plate D and the fulcrum-piece F, adapted to adjust the tension of the retractor-spring, substantially as and for the purpose set forth.

WILLIAM E. NICKERSON.

Witnesses:
FRANK G. PARKER,
FRANK W. ALDEN.